Dec. 13, 1966 G. B. HALE 3,290,706
BOAT
Filed Dec. 17, 1964 2 Sheets-Sheet 1
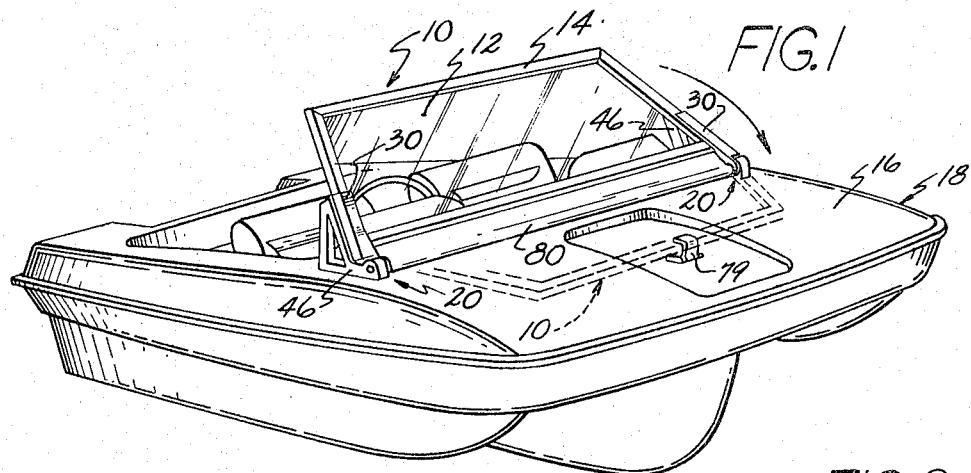
FIG. 1
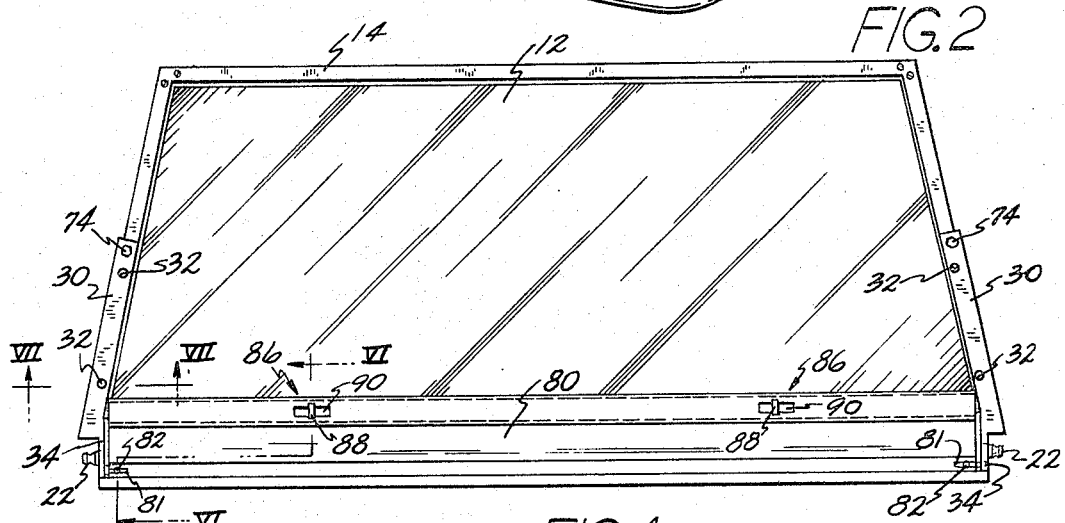
FIG. 2
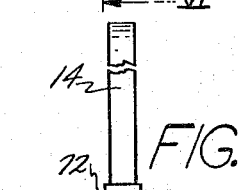
FIG. 3
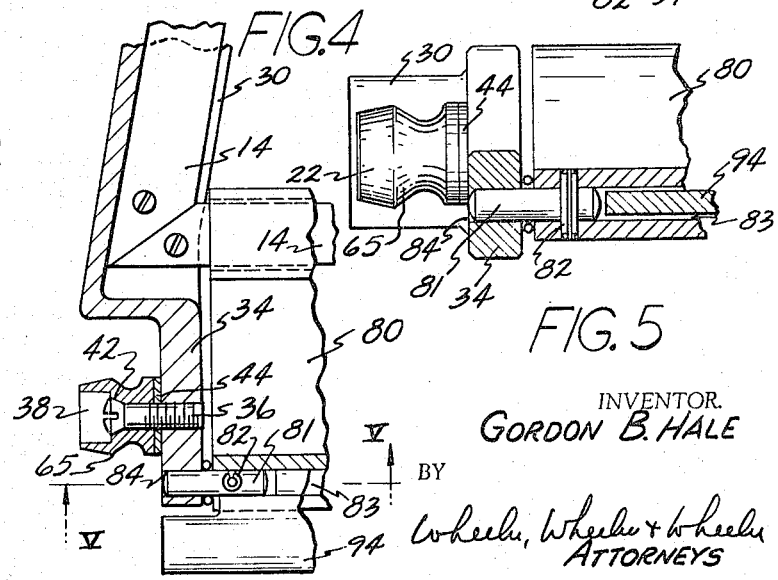
FIG. 4
FIG. 5
INVENTOR.
GORDON B. HALE
BY
Wheeler, Wheeler + Wheeler
ATTORNEYS

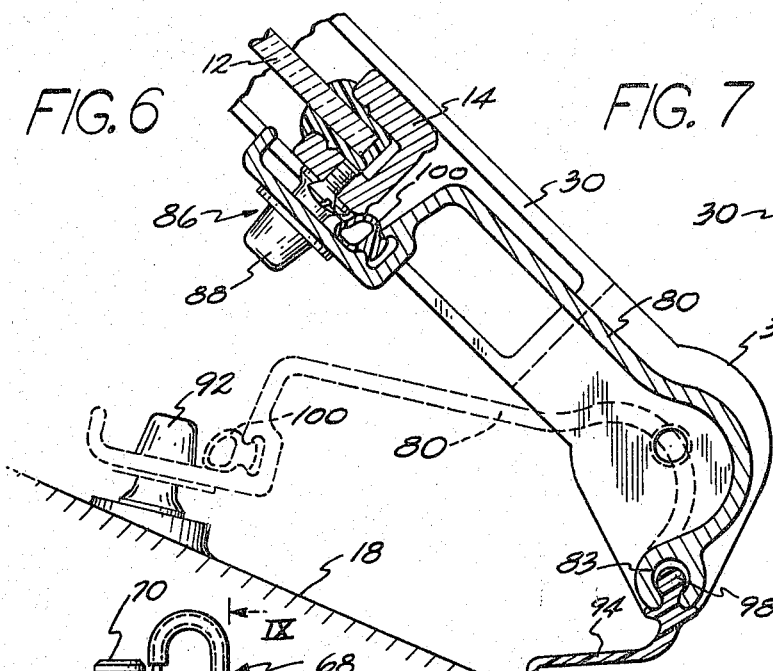
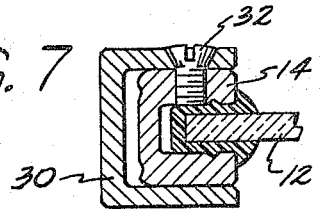
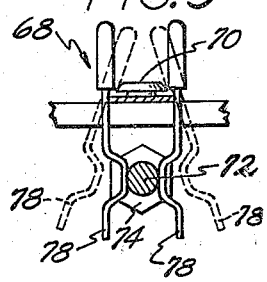
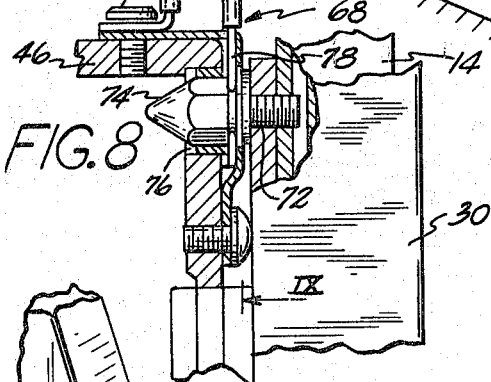
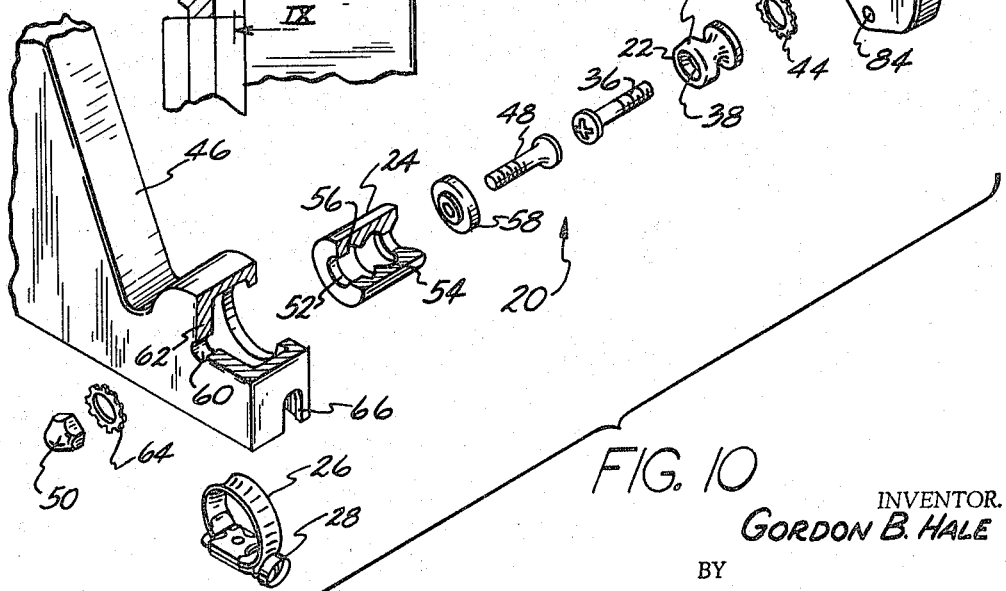

United States Patent Office 3,290,706
Patented Dec. 13, 1966

3,290,706
BOAT
Gordon B. Hale, Waukegan, Ill., assignor to Outboard Marine Corporation, Waukegan, Ill., a corporation of Delaware
Filed Dec. 17, 1964, Ser. No. 418,989
11 Claims. (Cl. 9—1)

This invention relates to windshields and more particularly to boat mounted windshields.

According to the present invention, a windshield is pivotally connected to the boat at opposite sides thereof by a coupling affording an adjustably variable frictional resistance to movement. The windshield, which is movable between a generally upright shielding position and a generally horizontal position, has an integral vent which is movable therewith. The vent is also movable between open and closed positions relative to the windshield.

The principal object of the present invention is to provide a new and improved windshield pivotal between generally horizontal and vertical positions.

Another object of this invention is to provide a new and improved windshield having an integral vent movable between open and closed positions relative to the windshield.

Another object is to provide a windshield having a connection to the boat which provides an adjustably variable frictional resistance to movement.

Further objects are to provide a windshield capable of silent absorption of vibration and impact when in the upright shielding and horizontal positions.

Other objects and advantages will become apparent from the following description and the accompanying drawings in which:

FIGURE 1 is a perspective view of a boat embodying various of the features of the invention;

FIGURE 2 is a rear elevational view of the windshield embodied in the boat shown in FIGURE 1;

FIGURE 3 is a side elevational view of the windshield frame shown in FIGURE 2;

FIGURE 4 is an enlarged fragmentary view, partially in section, taken along line IV—IV of FIGURE 3;

FIGURE 5 is an enlarged fragmentary view, partially in section, taken along live V—V of FIGURE 4;

FIGURE 6 is an enlarged fragmentary sectional view taken along the line VI—VI of FIGURE 2;

FIGURE 7 is a fragmentary sectional view taken along line VII—VII of FIGURE 2;

FIGURE 8 is an enlarged, fragmentary view, partially in section, of a portion of the windshield frame and deck bracket incorporated in the boat shown in FIGURE 1;

FIGURE 9 is a fragmentary view, partially in section, taken along line IX—IX of FIGURE 8; and FIGURE 10 is a fragmentary exploded view of one of the pivotal windshield mountings embodied in the boat shown in FIGURE 1.

Referring now to the drawings, and more particularly to FIGURES 1, 2 and 10, the windshield 10 comprises a generally rectangular glass pane 12 framed by a windshield frame 14. In accordance with the present invention, means are provided for mounting the windshield frame 14 on the deck 16 of a boat 18 to afford pivotal movement with respect to boat 18 and adjustably variable frictional resistance to such movement. Various means can be employed to provide such a pivotal connection of the windshield frame 14 to the boat 18. The means shown in the preferred embodiment of the present invention comprises a pair of aligned couplings 20, each affording adjustable variable frictional resistance to movement and comprising a trunnion 22 received in and gripped by a flexible or elastomeric socket 24. Means are provided for adjustably constricting the socket 24 to vary the grip between the socket 24 and the trunnion 22 and ultimately the frictional resistance to movement of the trunnion 22 in the socket 24. While various means can be employed, in the disclosed construction such constricting means comprises an adjustable size constricting collar 26 fitted around the outer periphery of the socket 24. The diameter of the collar 26 can be varied as by turning an adjusting screw 28 in either direction.

Each side of windshield frame 14 carries a member 30 which is fixed to windshield frame 14 by screws 32, as shown in FIGURES 2 and 7. The lower end 34 of member 30 extends below the windshield frame 14 and carries the trunnion 22 which is secured thereto by suitable fastening means. In the preferred embodiment of the invention, the means for mounting trunnion 22 to the member 30 comprises a screw 36 received in a central bore 38 in the trunnion 22 and screwed into the member 30. A central bore 38, which is of varying diameter, extends through the trunnion 22 and forms a land 42 for abutment there against by the head of screw 36. To insure a tight securement of the trunnion 22 to the member 30, a lock washer 44 is interposed between the two parts.

The sockets 24 are respectively mounted by suitable means to separate deck brackets or members 46 which are of generally triangular shape and which are carried on the deck 16. Specifically, such means comprises a screw 48 and nut 50. A bore 52 extends through socket 24 and has a partially spherical portion 54 and a adjacent grooved portion 56. A circular washer is fitted in the annular grooved portion 56 to serve as an abutment for the head of the screw 48. The screw 48 passes through a hole 60 in the outer wall 62 of deck brackets 46. Lock washer 64 is interposed between nut 50 and deck bracket 46 for tight securement.

The partially spherically outer surface 65 of the trunnion 22 is received in and gripped by the partially spherical portion 54 of the socket 24. The spherical shapes of the cooperating parts of each coupling 20—namely, the trunnion 22 and the socket 24—accommodate a certain amount of misalignment between the aforementioned cooperating parts and facilitate mounting the windshield 10 on boat 18. The collar 26 is fitted around a portion of the outer surface of socket 24 containing spherical portion 54. The head of adjusting screw 28 fits in the U-groove 66 for easy access thereto. Tightening of collar 26 squeezes the elastomeric socket 24 on trunnion 22 thereby increasing the frictional resistance to movement and eliminating any end-play between the trunnion 22 and the socket 24.

The windshield frame 14 is movable between a generally upright shielding position, shown by solid lines in FIGURE 1, and a generally horizontal position, shown by broken lines in FIGURE 1. When the windshield frame 14 is in the upright position, it rests against the deck brackets 46, which serve as a stop. Disconnectable means are provided on each of the deck bracket 46 for holding the windshield frame 14 in the upright position. In the preferred embodiment of this invention, each disconnectable means (FIGURES 8 and 9) comprises a spring latch 68 disposed on the top portion of the associated deck bracket 46 and connected thereto by screw 70. Each latch 68 includes a guide pin 72 which extends from the windshield frame 14 and has an enlarged tapered head 74 receivable in a hole 76 in the deck bracket 46 when the windshield frame 14 is locked in the upright position. The head 74 is spaced from the surface of member 30 to allow a pair of locking members 78 to fit behind the head 74 and engage the guide pin 72 thereby securing windshield frame 14 to deck bracket 46. The latch 68 is easily disengaged as by pressing together the top portion of the locking members 78 thereby spreading the locking members 78, as shown by the broken lines in FIGURE 9. In this manner, the head 74 can be removed from the hole in the deck bracket 46, and the windshield 10 can be lowered to a generally horizontal position.

When the windshield 10 is in a generally horizontal position, it is raised slightly from the deck 16 and rests against the base of a disconnectable flip-latch 79. The flip-latch 79 also locks the windshield 10 in the horizontal position.

Referring now to FIGURES 2, 4, 5 and 6, integral with the windshield 10 is a vent 80 disposed between the members 30 and below the windshield frame 14. Means are provided for pivotally connecting the vent 80 to the lower ends 34 of members 30 at a point below the trunnions 22 for common movement of the vent 80 with the windshield frame 14 relative to the generally upright shielding position, and for movement of the vent 80 between open and closed positions with respect to the windshield frame 14. Specifically, such means comprises a pair of pins 81 which have one of their respective ends immovably fitted as by a cotter pin 82 in the opposite ends of transverse bore 83 in the lower portion of the vent 80. The other end of each pin 81 is journalled in holes 84 through the lower end 34 of the member 30.

Referring to FIGURE 6, the vent 80 is movable between open and closed positions relative to the windshield frame 14—the open position being shown by the broken lines. Disconnectable means are provided on the windshield 10 and the vent 80 for holding the latter in a closed position relative to the windshield 10. Specifically, such means comprises a latch 86 having a turnable member 88 which is mounted on the windshield 10 and which is engageable in a slot 90 in the vent 80.

Disconnectable means are provided on the boat 18 and the vent 80 for holding the latter in an open position. Specifically, such means comprises a turnable latch member 92 which is mounted on the boat 18 annd which is cooperable with the slot 90.

Flexible means are provided on the lower portion of the vent 80 for sealing the gap between the vent 80 and the boat 18 to keep water and air from entering therethrough. In the preferred embodiment of this invention, a flexible rubber member or element 94 is disposed between the bottom of the vent 80 and the boat 18. The rubber element 94 extends the length of the vent 80 and has a lower flexible portion 96 contacting the boat 18 and has at its upper edge a bead 98 received in the bore 83. As can be noted in FIGURE 6, the rubber element 94 does not move to any great extent as the vent 80 is moved between open and closed positions or vice versa.

Means are provided on the upper portion of the vent 80 for sealing the gap between the vent 80 and the bottom of the windshield frame 14. Specifically, such means comprises a rubber strip 100 disposed along the upper edge of the vent 80. When the vent 80 is locked in the closed position, the strip 100 is compressed against the windshield frame 14 to form a tight seal for preventing the entry of air and water therebetween.

Because of the elastomeric nature of the socket 24, use of the couplings 20 to mount the windshield 10 to the boat 18 affords isolation of the windshield 10 from the normal vibrations and impacts inherent in the operation of a boat 18. The couplings 20 also serve to eliminate any undesirable rattle of windshield 10 due to vibration or impact.

The frictional resistance of the coupling 20 can be made sufficiently great so as to maintain the windshield in any position without further support. Therefore, frictional resistance of a sufficient magnitude is available to prevent slamming of the windshield 10 against the deck brackets 46 or the deck 16 thus preventing possible damage to the windshield 10 or the deck 16. Also, couplings 20 are self-cleaning and corrosion-resistant thus requiring generally little or no maintenance and are also a nonconductor of electricity.

Various of the features of the invention are set forth in the following claims.

What is claimed is:

1. The combination of a boat, a windshield frame, a non-metallic elastomeric socket mounted on one of said boat and said frame, a trunnion mounted on the other of said boat and said frame and received in and gripped by said socket for pivotal movement of said windshield frame with respect to said boat, and annular means located coaxially with said trunnion and mounted on the outer circumferential periphery of said socket for adjustably varying the grip between said socket and said trunnion.

2. The combination of a boat, a windshield frame, a first member mounted on one of said frame and said boat and having a non-metallic elastomeric socket, a second member mounted on the other of said frame and said boat and having a trunnion received in and gripped by said socket for pivotal movement of said windshield frame between generally vertical and generally horizontal positions with respect to said boat, first and second disconnectable means on each of said frame and said boat for respectively holding said windshield frame in the generally vertical position and in the generally horizontal position, and means for adjustably varying the grip between said socket and said trunnion.

3. The combination of a boat, a windshield frame, a non-metallic elastomeric socket having a partially spherical bore and fixed to one of said boat and said frame, a trunnion having a partially spherical surface and mounted on the other of said boat and said frame, said trunnion being received in and gripped by said spherical portion of said socket for pivotal movement of said windshield frame with respect to said boat, and annular means located coaxially with said trunnion for adjustably constricting said socket to vary the grip between said socket and said trunnion.

4. The combination of a boat, a windshield frame having two generally aligned pivotal connections to said boat, each of said pivotal connections comprising a non-metallic elastomeric socket mounted on one of said boat and said frame, a trunnion mounted on the other of said boat and said frame and received in and gripped by said socket for pivotal movement of said windshield frame with respect to said boat, and an adjustable size constricting collar located coaxially with said trunnion and fitted around said socket for adjustably varying the grip between said socket and said trunnion.

5. The combination of a boat, a windshield frame, an elastomeric socket having a through bore with a partially spherical portion and an adjacent annular grooved portion, a circular washer received in said annular grooved portion, and fastening means passing through said washer and connecting said socket to one of said boat and said windshield frame, a trunnion having a partially spherical outer surface received in and gripped by said spherical portion of said socket, said trunnion having a central bore, and fastening means received in said bore and connecting said trunnion to the other of said boat and said windshield frame, and an adjustable size constricting collar fitted around the outer periphery of said socket for varying the grip between said trunnion and said socket.

6. The combination of a boat, a frame a windshield supported by said frame, means mounting said frame on said boat for movement relative to a generally upright shielding position, a vent, and means spaced below said means mounting said frame on said boat and pivotally mounting said vent on said frame below said windshield for common movement with said frame relative to said upright position and for movement of said vent between open and closed positions with resepct to said frame.

7. The combination of a boat, a windshield frame, an elastomeric socket mounted on said boat, a member mounted on said windshield frame, a trunnion mounted on said member and received in and gripped by said socket to afford movement of said windshield frame relative to a generally upright shielding position, a vent, means pivotally mounting said vent on said member at a point below said trunnion and for common movement of said vent with said windshield frame relative to said upright position and for movement of said vent between open and closed positions with respect to said windshield frame, and disconnectable means connecting said vent to said windshield frame for maintaining said vent in the closed position.

8. The combination of a boat, a windshield frame, an elastomeric socket mounted on said boat, a member mounted on said windshield frame, a trunnion, means mounting said trunnion to said member, said trunnion being received in and gripped by said socket to afford movement of said windshield frame relative to a generally upright shielding position, a vent, means mounting said vent on said member at a point below said means mounting said trunnion to said member and for common movement of said vent with said windshield frame relative to said upright position and for movement of said vent between open and closed positions with respect to said windshield frame, and disconnectable means on said boat and on said vent for holding said vent in the open position with respect to said windshield frame when said windshield frame is in the upright position.

9. The combination of a boat, a windshield frame, a first member mounted on said boat and including an elastomeric socket having a partially spherical bore, a second member mounted on said windshield frame and extending below the bottom of said windshield frame, a trunnion mounted on said second member and having a partially spherical surface received in and gripped by said partially spherical bore of said socket for movement of said windshield frame between a generally upright shielding position and a generally horizontal position extending forward of said upright position, an adjustable size constricting collar fitted around the outer periphery of said socket for varying the grip between said trunnion and said socket, a vent disposed below the bottom of said windshield frame and pivotally connected to said second member for movement of said vent between open and closed positions with respect to said windshield frame when the latter is in the upright position, disconnectable means on said boat and on said vent for holding said vent in the open position, disconnectable means on said windshelf frame and on said vent for holding said vent in the closed position for common movement of said vent with said windshield frame, flexible means on the lower part of said vent for forming a seal between said vent and said boat, and means on the upper part of said vent for forming a seal between said vent and said windshield frame when the latter is in the closed position.

10. The combination of a boat, a windshield frame having a lower part, a first member mounted on one of said frame lower part and said boat and having a non-metallic elastomeric socket, a second member mounted on the other of said frame lower part and said boat and having a trunnion received in and gripped by said socket for pivotal movement of said windshield frame between generally vertical and generally horizontal positions with respect to said boat, first and second disconnectable means on each of said frame and said boat for respectively holding said windshield frame in the generally vertical position and in the generally horizontal position, and means for adjustably varying the grip between said socket and said trunnion.

11. The combination of a boat, a windshield, a frame supporting said windshield and having a lower part, an elastomeric socket mounted on said boat, a member mounted on said windshield frame lower part, a trunnion mounted on said member and received in and gripped by said socket to afford movement of said windshield frame relative to a generally upright shielding position, a vent, means pivotally mounting said vent below said windshield and on said member at a point below said trunnion and for common movement of said vent with said windshield frame relative to said upright position and for movement of said vent between open and closed positions with respect to said windshield frame, and disconnectable means connecting said vent to said windshield frame for maintaining said vent in the closed position.

References Cited by the Examiner
UNITED STATES PATENTS

| | | | |
|---|---|---|---|
| 1,116,267 | 11/1914 | Hammon | 296—94 |
| 1,440,714 | 1/1923 | Berry | 296—94 |
| 1,520,051 | 12/1924 | Boca | 296—92 |
| 1,788,436 | 1/1931 | Lunt | 9—1 |
| 1,929,807 | 10/1933 | Casper | 287—85 X |
| 2,862,740 | 12/1958 | Alexander | 287—85 |

MILTON BUCHLER, *Primary Examiner.*

T. M. BLIX, *Assistant Examiner.*